United States Patent [19]

Thelander, Sr. et al.

[11] 4,191,285
[45] Mar. 4, 1980

[54] WEAR COMPENSATOR FOR BELLEVILLE SPRING CLUTCH

[75] Inventors: W. Vincent Thelander, Sr., Cave Creek, Ariz.; Terry K. Lindquist, Troy, Mich.

[73] Assignee: Borg-Warner Corporation, Chicago, Ill.

[21] Appl. No.: 830,926

[22] Filed: Sep. 6, 1977

[51] Int. Cl.$^2$ .................. F16D 11/00; F16D 13/75
[52] U.S. Cl. .................. 192/111 A; 192/70.25; 188/71.8; 188/196 R
[58] Field of Search .................. 192/111 A, 70.25; 188/71.8, 196 R

[56] References Cited

U.S. PATENT DOCUMENTS

| | | | |
|---|---|---|---|
| 1,631,235 | 6/1927 | Trumble | 192/70.25 |
| 2,221,399 | 11/1940 | Geyer | 192/32 |
| 2,280,355 | 4/1942 | Spase et al. | 192/70.75 |
| 2,562,613 | 7/1951 | Halberg | 192/111 A |
| 2,680,505 | 6/1954 | Halberg | 192/111 A |
| 4,086,995 | 5/1978 | Spokas | 192/70.25 |

Primary Examiner—C. J. Husar
Assistant Examiner—James Yates
Attorney, Agent, or Firm—James A. Geppert

[57] ABSTRACT

An automatic wear compensator for the clutch friction faces of a diaphragm or Belleville spring-actuated clutch for an automotive vehicle to maintain optimum spring characteristics and uniform clutch release lever and bearing position through the utilization of a rotatable cam ring positioned on the backside of the clutch pressure plate and several levers pivotally mounted in slots in the pressure plate. One end of each lever is adapted to engage the clutch flywheel and the opposite end of the lever operatively engages a projection on the cam ring, with the spacing between the flywheel and the pressure plate determining whether the levers are pivoted to rotate the cam ring.

23 Claims, 8 Drawing Figures

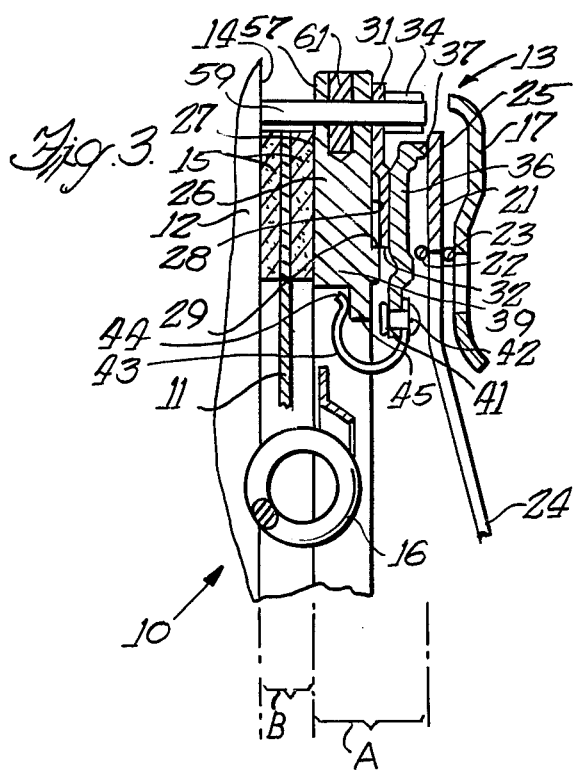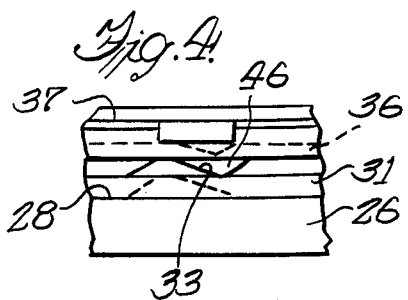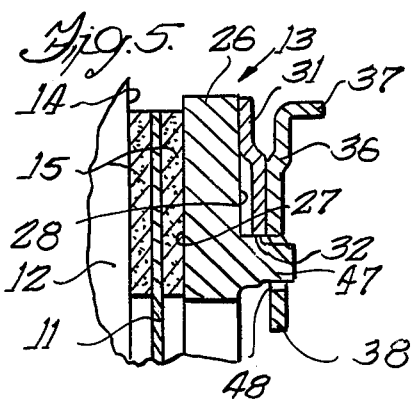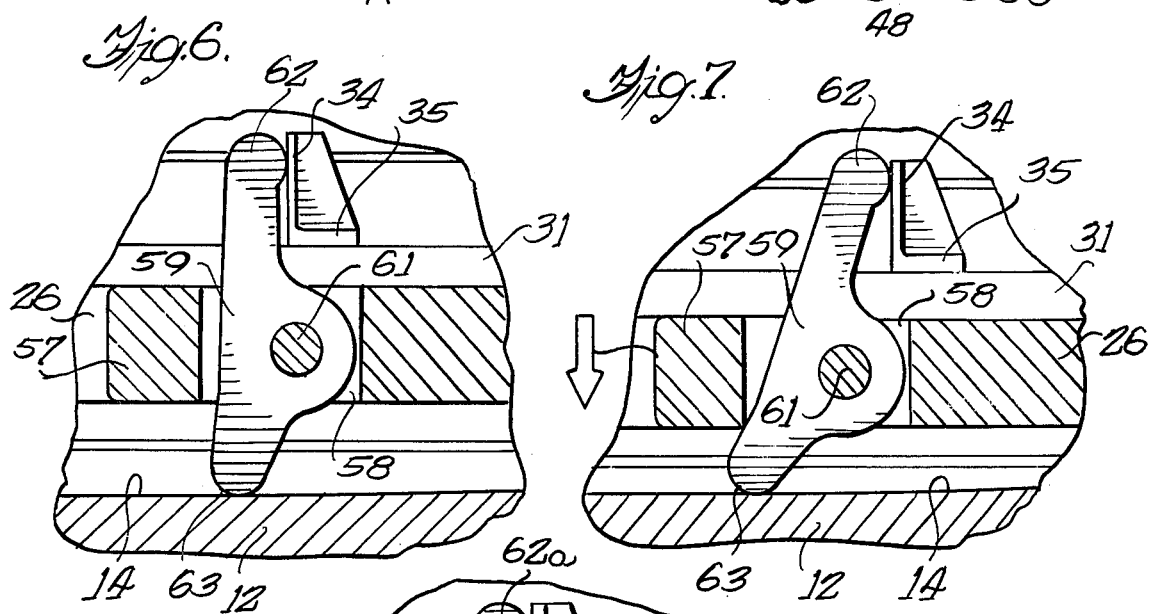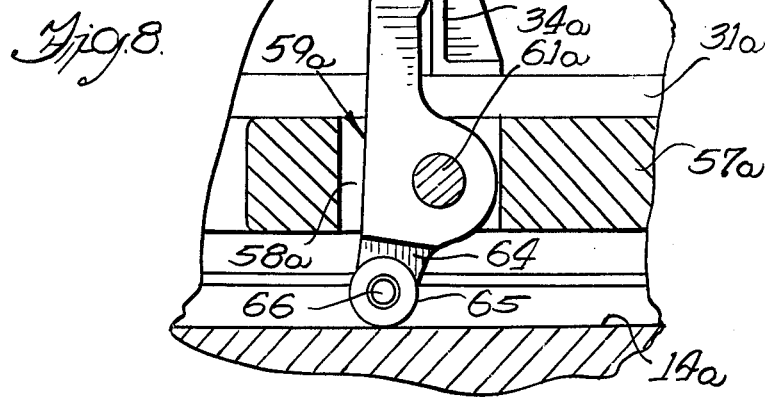

WEAR COMPENSATOR FOR BELLEVILLE SPRING CLUTCH

BACKGROUND AND SUMMARY OF THE INVENTION

Vehicle clutches of the diaphragm spring type typically include a flywheel, a clutch disc splined onto a driven shaft, an axially movable pressure plate rotatable with the flywheel, a fulcrum surface on or operatively connected to the pressure plate, a clutch cover secured to the flywheel, a diaphragm spring engaging the fulcrum surface on the pressure plate and a separate fulcrum surface on the cover, and a release bearing axially reciprocable on the driven shaft to engage radially inwardly extending fingers of the diaphragm spring. During actuation of the diaphragm spring by the release bearing to retract or advance the pressure plate, the spring will pivot about a wire pivot ring in the clutch cover with the outer edge of the spring engaging the pressure plate fulcrum. Upon release and re-engagement of the clutch, all of the parts will retain the same relationship.

The characteristic curve of a Belleville spring as employed in most clutches provides a plate load of approximately 1400 pounds when the clutch parts are new and engaged. Upon clutch release, pulling back the pressure plate 0.080 inches reduces the plate load to about 700 pounds and results in an acceptable pedal pressure for the vehicle operator. As wear occurs, the pressure plate with the clutch engaged moves toward the flywheel, such that at 0.080 inches wear of the friction facings, the plate load is increased to 2100 pounds, and when released for a distance of 0.080 inches, the load is reduced to 1400 pounds. This results in a pedal pressure approximately twice as large as the original pressure which is very objectionable to the operator.

Also, when there is wear in the system, particularly wear to the clutch friction surfaces, the diaphragm spring moves through a greater arc of travel and the release bearing must move a greater distance to effect a complete clutch release. Due to the movement of the pressure plate towards the flywheel upon friction facing wear, the change in pressure plate position forces the spring fingers of the diaphragm spring into greater pressure engagement with the release bearing which may bind the bearing against the release fork. To alleviate this problem, the vehicle operator must have the clutch serviced to reposition the release bearing. A large percentage of clutch failures in passenger cars have been due to neglect in maintaining proper adjustment of the clutch system.

To alleviate this problem, various methods of automatic adjustment were attempted with emphasis on adjusting the release bearing carrier. The present invention overcomes the present problems of clutch wear by an adjustment of the pressure plate fulcrum position relative to the flywheel.

The present invention comprehends the provision of an automatic wear adjuster for vehicle clutches of the diaphragm spring type that maintains the original load characteristics of the diaphragm spring. This is accomplished by sensing the decrease in the distance between the flywheel and pressure plate due to clutch friction facing wear when the clutch is engaged and increasing the dimension between the clutch engaging face of the pressure plate and the spring-engaging surface of the fulcrum.

The present invention also comprehends the provision of an automatic wear adjuster for a diaphragm spring clutch wherein the spring engaging fulcrum on the pressure plate comprises a pressure ring in operative engagement with the rear surface of the pressure plate having the spring fulcrum formed thereon. A cam ring is positioned between the pressure plate and pressure ring and has camming surfaces cooperating with similar cam surfaces formed on the pressure plate. Rotation of the cam ring will cause axial movement of the pressure ring relative to the pressure plate.

The present invention further comprehends the provision of an automatic wear adjuster for vehicle clutches wherein a plurality of levers sense the change in the distance between the flywheel and pressure plate due to clutch wear. The levers are pivoted on the pressure plate with one end of each lever acting to contact the clutch engaging surface of the flywheel. The opposite end of each lever is adapted to engage a projection on the cam ring, such that rotation of the levers due to contact with the flywheel upon clutch wear will cause a corresponding rotation of the cam ring to raise the pressure ring.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 3 is a cross sectional view taken on the line 3—3 of FIG. 1.

FIG. 4 is a side elevational view taken on the line 4—4 of FIG. 1.

FIG. 5 is a cross sectional view taken on the irregular line 5—5 of FIG. 1.

FIG. 6 is an enlarged cross sectional view taken on the line 6—6 of FIG. 1.

FIG. 7 is a cross sectional view similar to FIG. 6, but showing the lever pivoted to an adjusting position.

FIG. 8 is a cross sectional view similar to FIG. 6, but showing an alternate embodiment of pivoted lever.

DESCRIPTION OF THE PREFERRED EMBODIMENTS

Figure 1:
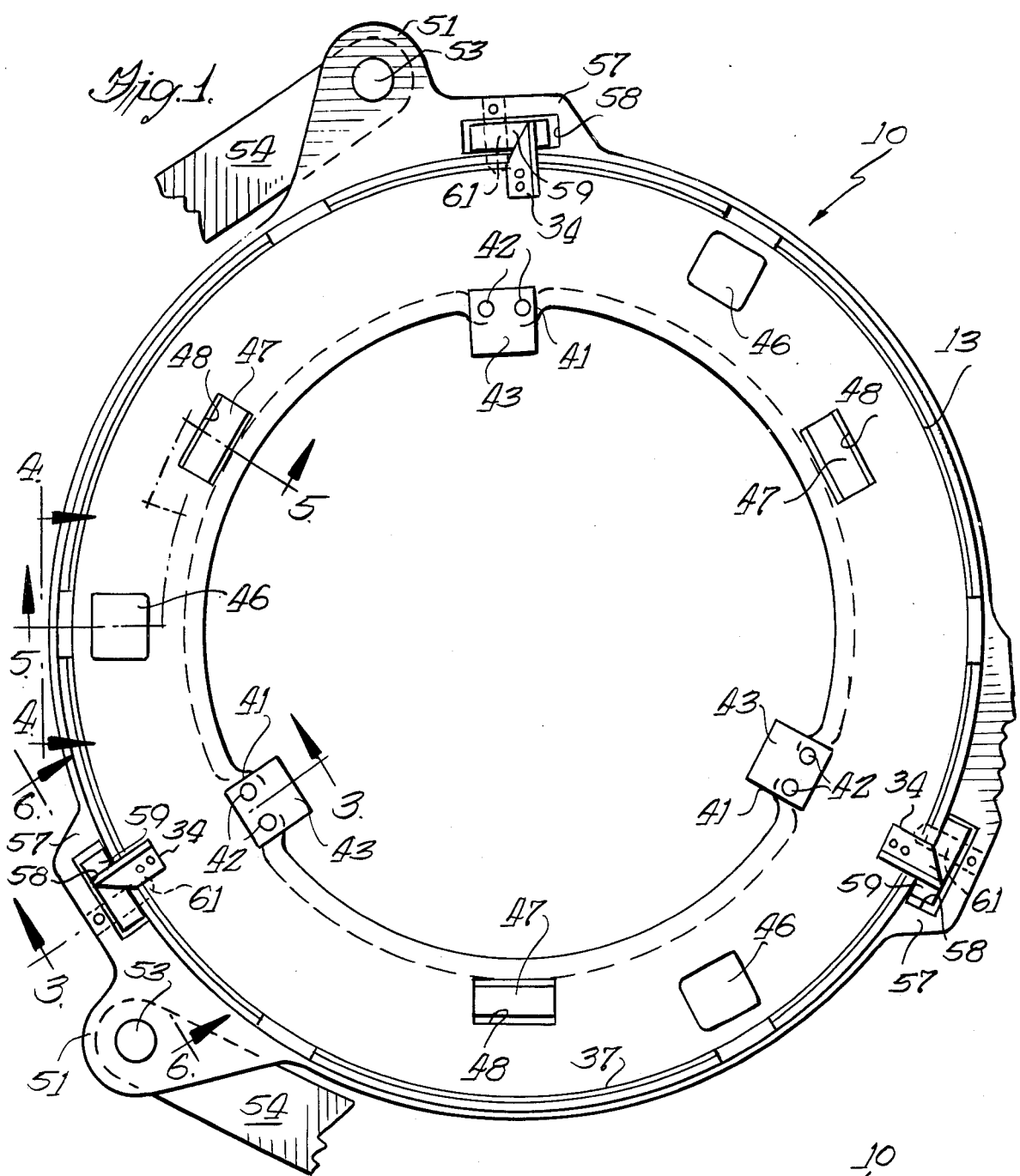
FIG. 1 is a rear elevational view of a pressure plate assembly utilizing the automatic adjustment feature of the present invention with the clutch cover omitted.

Referring more particularly to the disclosure in the drawings wherein are shown illustrative embodiments of the present invention, FIG. 1 discloses a clutch assembly 10 including a clutch disc 11, a flywheel 12 (FIGS. 3 and 5) and a pressure plate assembly 13. The flywheel 12 is suitably secured to an engine output shaft (not shown) and has a friction surface 14 facing one of the friction facings 15, 15 mounted on the outer portion of the clutch disc 11. Also, the clutch disc 11 may have a suitable vibration damper, shown partially at 16, between the clutch disc and the hub on the output shaft to the transmission (not shown). A coverplate 17 has an outer skirt 18 terminating in a radial flange 19 that is suitably secured to the flywheel so as to rotate therewith.

A diaphragm or Belleville spring 21 is positioned between the coverplate 17 and a pressure plate assembly 13 and suitably secured to the coverplate by shoulder rivets (not shown) which also act to support a wire ring 22 contacting the spring in a conventional manner. Likewise, a second wire ring 23 is positioned between the spring and the cover plate; the wire rings 22, 23 being generally axially aligned in the clutch and act to provide fulcrum surfaces for the spring intermediate its inner and outer peripheries. Radially inwardly of the wire rings, the spring is formed into a series of spring fingers 24 adapted to be engaged at their inner ends by a clutch release bearing (not shown). Adjacent the outer edge 25, the spring engages the fulcrum surface 37 to be later described, of the pressure plate assembly 13.

The pressure plate assembly 13 includes a generally annular pressure plate 26 having a clutch engaging surface 27 at one face and a camming surface 28 on the opposite face. The camming surface 28 is a machined flat surface having a pilot shoulder 29 at the inner edge thereof to receive a cam ring 31 thereon. The cam ring is a generally annular flat metal ring having an inner periphery 32 engaging the shoulder 29 and a plurality (preferably three or six) of equally spaced inclined camming surfaces 33 (see FIG. 4) at the inner periphery 32. The ring 31 is in substantial engagement with the camming surface 28 on the pressure plate and it is provided with a plurality of circumferentially equally spaced upturned projections or ears 34 on the outer periphery for a purpose to be later described; each ear either having a base 35 suitably secured to the cam ring 31 or formed integral with the ring.

A generally flat pressure ring 36 engages the cam ring 31 and is provided with a continuous upturned outer edge 37 forming the fulcrum surface or edge engaged by the diaphragm spring 21 adjacent the outer periphery 25 thereof. The inner edge 38 of the pressure ring extends slightly inwardly of the inner periphery 39 of the pressure plate 26 and is provided with a plurality of ears 41 to which are secured by rivets 42, a plurality of curled spring clips 43 each having a free edge 44 engaging an ear 45 formed on the inner periphery 39 of the pressure plate 26. The spring clips 43 provide sufficient spring tension to yieldably urge the pressure ring 36 and the cam ring 31 against the pressure plate 26.

The pressure ring also includes a plurality of circumferentially equally spaced cam surfaces 46, corresponding in number to the cam surfaces 33 on the cam ring 31, adapted to engage and cooperate with the cam surfaces 33 for a purpose to be later described. At several circumferentially equally spaced locations on the pressure plate 26 are upwardly projecting lugs 47 formed adjacent the inner periphery 39 and projecting through complementary openings 48 formed in the pressure ring 36.

The pressure plate 26 is provided with three circumferentially equally spaced outwardly projecting ears 51, each ear having an opening 52 for a rivet 53 to secure one end of a drive strap 54 to the ear. The opposite end of each drive strap is secured, as by a rivet 55, to ears 56 formed on the coverplate 17 (see FIG. 2). Thus, the pressure plate 26 will rotate with the coverplate 17 and the flywheel 12 during operation of the clutch, and the drive straps 54, besides connecting the pressure plate to the coverplate, also act as retractor springs for the pressure plate 26 when the clutch is released.

Adjacent each ear 51, a lug 57 is formed on the pressure plate as a continuation of the ear and is provided with a slot 58 extending therethrough to receive a pivotable lever 59 therein. The lever is pivoted on a pivot pin 61 secured in the lug 57 and has a rear slightly enlarged end 62 providing a curved surface adapted to engage the adjacent surface of the ear 34. The forward end of the lever has a rounded surface 63 which is positioned closely adjacent the clutch engaging surface 14 of the flywheel.

Considering the operation of the present invention, the release and re-engagement of the clutch by the vehicle operator is conventional and not altered by the difference in the pressure plate assembly 13. With respect to the automatic adjustment of the clutch assembly 10, when the clutch is newly installed and engaged, the pressure plate 26, cam ring 31 and pressure ring 36 are loaded by the Belleville spring 21 with the levers 59 in contact with the flywheel 12 and the projections 34 on the cam ring. The face 27 of the pressure plate 26 has a dimensional relationship with the upturned edge 37 of the pressure ring 36, shown as the distance "A" in FIG. 3. Upon clutch release, all parts will maintain the same relationship in moving rearwardly together. Upon re-engagement, assuming no wear has occurred, all parts will maintain the same relationship.

Figure 2:
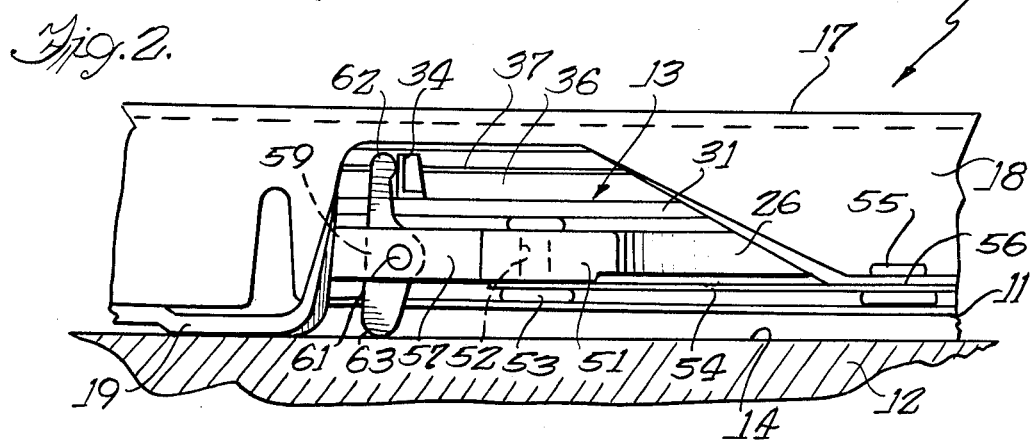
FIG. 2 is a partial side elevational view of the pressure plate assembly, flywheel and clutch cover and showing an adjustment lever in operative position.

With wear taking place on the clutch friction facings 15, 15, the distance "B" between the flywheel 12 and the pressure plate 26 will decrease. Therefore, when the clutch is released, the parts again maintain the same relationship, however, upon re-engagement, the ends 63 of the levers 59 will contact the flywheel surface 14 before full engagement of the clutch disc 11 occurs, causing the levers to pivot in a clockwise direction, as seen in FIG. 2, and engage the projections 34 to rotate the cam ring 31 counterclockwise, as seen in FIG. 1. This rotation causes the inclined cam surfaces 33, 46 to engage the cause the pressure ring 36 to move axially away from the pressure plate 26, thus increasing the dimension "A" by the amount of wear occurring on the friction facings. Therefore, with continuing wear, each successive re-engagement of the clutch increases the dimension "A", thereby maintaining the original geometry of the spring 21 with its load characteristics at an optimum level and any undesirable increase in plate load and pedal pressure are avoided.

With respect to FIG. 8, an alternate embodiment of pivot lever 59a is shown mounted on pivot pin 61a in a slot 58a of the lug 57a on the pressure plate 26a. The lever has a rearwardly extending arm terminating in a rounded end 62a in contact with the projection 34a of the cam ring 31a and a forwardly projecting bifurcated end 64 to receive an antifriction roller 65 on a pin 66 mounted in the bifurcations. The roller 65 is adapted to engage the flywheel surface 14a to provide adjustment in the same manner as previously described for the lever 59.

I claim:

1. An automatic wear compensator for a diaphragm spring-actuated friction clutch assembly including a flywheel, a friction clutch disc, a pressure plate assembly and a clutch cover secured to said flywheel, said pressure plate assembly comprising a pressure plate operatively connected to said clutch cover, a pressure ring operatively connected to said pressure plate to rotate therewith, camming means interposed between said pressure plate and pressure ring to alter the distance therebetween, fulcrum means for the diaphragm spring on said pressure ring, and means for engaging said flywheel to sense the wear of said friction clutch disc and actuate said camming means.

2. An automatic wear compensator as set forth in claim 1, in which said fulcrum means comprises an upturned outer peripheral edge on said pressure ring, wherein, as the distance between the flywheel and pressure plate decreases, the distance between the pressure plate and the fulcrum edge automatically increases by an identical increment.

3. An automatic wear compensator as set forth in claim 1, in which said pressure plate has a plurality of circumferentially equally spaced upwardly projecting lugs, and said pressure ring has a corresponding number of openings receiving said lugs so that the pressure plate and pressure ring rotate simultaneously.

4. An automatic wear compensator for a diaphragm spring-actuated friction clutch assembly including a flywheel, a friction clutch disc, a pressure plate assembly and a clutch cover secured to said flywheel, said pressure plate assembly comprising a pressure plate operatively connected to said clutch cover, a pressure ring operatively connected to said pressure plate to rotate therewith, a cam ring interposed between and rotatable relative to said pressure plate and pressure ring to alter the distance therebetween, fulcrum means for the diaphragm spring on said pressure ring, and means sensing the wear of said friction clutch disc and actuating said cam ring.

5. An automatic wear compensator as set forth in claim 4, in which said cam ring has a plurality of circumferentially equally spaced inclined cam surfaces, and said pressure ring has a corresponding number of complementary cam surfaces cooperating therewith.

6. An automatic wear compensator as set forth in claim 1, in which said pressure ring is resiliently biased toward said pressure plate.

7. An automatic wear compensator as set forth in claim 6, including a plurality of circumferentially equally spaced spring clips secured to the inner periphery of said pressure ring, and a corresponding number of ears on the inner periphery of the pressure plate engaged by the spring clips.

8. An automatic wear compensator as set forth in claim 7, in which each spring clip has a generally C-shape with one end secured to the pressure ring and the free end engaging under a pressure plate ear to bias the plate and ring together.

9. An automatic wear compensator for a diaphragm spring-actuated friction clutch assembly including a flywheel, a friction clutch disc, a pressure plate assembly and a clutch cover secured to said flywheel, said pressure plate assembly comprising a pressure plate operatively connected to said clutch cover, a pressure ring operatively connected to said pressure plate to rotate therewith, camming means interposed between said pressure plate and pressure ring to alter the distance therebetween, fulcrum means for the diaphragm spring on said pressure ring, and a plurality of circumferentially equally spaced levers pivotally mounted in said pressure plate and adapted to engage said flywheel to sense the wear of said friction clutch disc and actuate said camming means.

10. An automatic wear compensator as set forth in claim 9, in which each lever has one end projecting toward said flywheel and the opposite end operatively connected to said camming means.

11. An automatic wear compensator as set forth in claim 10, wherein each said lever is substantially perpendicular to the plane of said flywheel when there is no wear on the friction clutch disc and, when wear occurs and the pressure plate is moved closer to the flywheel to fully engage the clutch disc, the levers engage the flywheel and are pivoted to rotate the camming means.

12. An automatic wear compensator as set forth in claim 10, in which said camming means comprises a cam ring interposed between the pressure plate and pressure ring and rotatable relative thereto, said cam ring and pressure ring having cooperating cam surfaces actuatable upon rotation of the cam ring by said levers.

13. An automatic wear compensator as set forth in claim 12, including a plurality of circumferentially equally spaced upstanding lugs on said cam ring cooperating with said levers to rotate the cam ring.

14. An automatic wear compensator as set forth in claim 13, in which said pressure ring is resiliently biased toward said cam ring and pressure plate.

15. An automatic wear compensator as set forth in claim 14, in which said fulcrum means comprises an upturned peripheral edge on said pressure ring, wherein, as the distance between the flywheel and pressure plate decreases, the distance between the pressure plate and the fulcrum edge automatically increases by an identical increment.

16. An automatic wear compensator as set forth in claim 9, in which said pressure plate includes a plurality of circumferentially equal spaced lugs on the periphery thereof, each lug having an elongated slot therethrough receiving a lever therein, and a pivot pin in said lug extending through said slot and said lever.

17. An automatic wear compensator as set forth in claim 16, in which each lever has an end with a curved surface engaging said camming means and an opposite end with a rounded edge adapted to engage said flywheel.

18. An automatic wear compensator as set forth in claim 16, in which each lever has an end with a curved surface engaging said camming means and a bifurcated opposite end, and a roller adapted to engage said flywheel and received in said bifurcated end.

19. An automatic wear compensator for a diaphragm spring-actuated friction clutch assembly including a flywheel, a friction clutch disc, a pressure plate assembly and a clutch cover secured to said flywheel, said pressure plate assembly comprising a pressure plate operatively connected to said clutch cover and having a plurality of circumferentially equally spaced upstanding lugs thereon, a pressure ring having a plurality of complementary openings receiving said lugs so as to rotate with said pressure plate, an upturned outer peripheral edge on said pressure ring forming a fulcrum for the diaphragm spring, a cam ring interposed between said pressure plate and pressure ring and rotatable relative thereto, said cam ring and pressure ring having cooperating camming surfaces thereon, spring clips secured to said pressure ring and engaging said pressure plate to bias the pressure ring and pressure plate together, and a plurality of circumferentially equally spaced levers, a plurality of circumferentially equally spaced peripheral lugs on said pressure plate, each lug having an elongated slot therethrough receiving a lever, a pivot pin in each lug extending through said slot and through said lever intermediate its ends, a plurality of upstanding lugs on said cam ring corresponding in number with said levers, each lever having one end engaging a cam ring lug and an opposite end engaging said flywheel when the clutch is engaged, such that the levers are substantially perpendicular to said flywheel when there is no friction clutch wear and, when wear occurs so that the pressure plate is moved closer to said flywheel to fully engage the clutch disc, the levers will engage the flywheel and be pivoted thereby to rotate the cam ring and correspondingly increase the distance between the pressure plate and the fulcrum edge.

20. An automatic wear compensator as set forth in claim 19, in which the end of each lever adjacent the flywheel is bifurcated to receive a roller engaging the flywheel.

21. An automatic wear compensator for a diaphragm spring-actuated friction clutch assembly including a flywheel, a friction clutch disc, a pressure plate assembly, and a clutch cover secured to said flywheel, said pressure plate assembly comprising a pressure plate operatively connected to said clutch cover, a pressure ring operatively connected to said pressure plate to rotate therewith, camming means interposed between said pressure plate and pressure ring to alter the distance therebetween, an upturned outer edge on said pressure ring forming a fulcrum for the diaphragm spring, and means for engaging said flywheel to sense the friction clutch disc wear and actuate said camming means such that a uniform clutch release bearing position is achieved by substantially maintaining the height of the radially inwardly extending release fingers of the diaphragm spring.

22. An automatic wear compensator as set forth in claim 21, in which the optimum spring load characteristics are achieved without a pedal pressure load change during facing wear and/or clutch release action.

23. An automatic wear compensator as set forth in claim 21, in which the linkage geometry may be optimally designed for a single release range of the release bearing movement rather than the large diversity of movements normally caused from new to worn clutch facings conditions.

* * * * *